United States Patent
Sobota Rodriguez

(10) Patent No.: US 10,023,057 B2
(45) Date of Patent: Jul. 17, 2018

(54) CONTACTLESS CHARGER AND BATTERY MANAGEMENT

(71) Applicant: Cristian A. Sobota Rodriguez, Tacoronte (ES)

(72) Inventor: Cristian A. Sobota Rodriguez, Tacoronte (ES)

( * ) Notice: Subject to any disclaimer, the term of this patent is extended or adjusted under 35 U.S.C. 154(b) by 193 days.

(21) Appl. No.: 15/133,189

(22) Filed: Apr. 19, 2016

(65) Prior Publication Data
US 2016/0311329 A1    Oct. 27, 2016

Related U.S. Application Data

(60) Provisional application No. 62/150,943, filed on Apr. 22, 2015.

(51) Int. Cl.
*H02J 7/00*    (2006.01)
*B60L 11/18*   (2006.01)
(Continued)

(52) U.S. Cl.
CPC ......... *B60L 11/182* (2013.01); *B60L 11/1824* (2013.01); *B60L 11/1838* (2013.01);
(Continued)

(58) Field of Classification Search
USPC ........................................................ 320/108
See application file for complete search history.

(56) References Cited

U.S. PATENT DOCUMENTS

2012/0175969 A1   7/2012  Maughan
2013/0119929 A1   5/2013  Partovi
(Continued)

FOREIGN PATENT DOCUMENTS

CN    204279932 U    4/2015
CN    205051397 U    2/2016
(Continued)

OTHER PUBLICATIONS

J. Miller, O. Onar, C. White, S. Campbell, C. Coomer, L. Seiber, R. Sepe, Jr., and A. Steyerl, "Demonstrating Dynamic Wireless Charging of an Electric Vehicle," IEEE Power Electronics Magazine, Mar. 2014, pp. 12-24.

(Continued)

*Primary Examiner* — Robert Grant
(74) *Attorney, Agent, or Firm* — Stephen W. Melvin

(57) ABSTRACT

An apparatus comprising a contactless battery synchronous power and a battery management system (BSP-BMS) is disclosed. This system includes a battery monitoring unit for monitoring the state of the batteries and a synchronous power unit for controlling the intensity and direction of current during both, charging and discharging processes, including one or several opto-inductive discs for the wireless energy transfer and fast and a lightweight communication scheme. The full system disclosed in this invention is very small in size, lightweight, cost effective and reliable due to its scalable structure, easy parallelization of current control elements and paths, and local and reliable opto-inductive coupling. The invention is aimed at universal, fast and automated charge processes and internal stored energy management for unmanned autonomous vehicles (UAVs) but it can be an effective solution for manned electric vehicles like electric bikes, electric motorcycles or other electric powered vehicles.

10 Claims, 17 Drawing Sheets

(51) Int. Cl.
  *B64C 39/02* (2006.01)
  *B64F 1/00* (2006.01)
  *H02J 7/02* (2016.01)
  *H02J 7/06* (2006.01)
  *H02J 50/80* (2016.01)
  *H02J 7/10* (2006.01)
  *H02J 50/10* (2016.01)

(52) U.S. Cl.
  CPC ........ *B60L 11/1853* (2013.01); *B64C 39/024* (2013.01); *B64C 39/028* (2013.01); *B64F 1/007* (2013.01); *H02J 7/00* (2013.01); *H02J 7/0027* (2013.01); *H02J 7/0042* (2013.01); *H02J 7/0093* (2013.01); *H02J 7/025* (2013.01); *H02J 7/06* (2013.01); *H02J 50/80* (2016.02); *B60L 2240/547* (2013.01); *B60L 2240/549* (2013.01); *B64C 2201/12* (2013.01); *H02J 50/10* (2016.02); *H02J 2007/0096* (2013.01); *H02J 2007/105* (2013.01); *Y02T 10/7005* (2013.01); *Y02T 10/705* (2013.01); *Y02T 10/7055* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | | | |
|---|---|---|---|---|
| 2014/0032034 | A1* | 1/2014 | Raptopoulos | G08G 5/0069 701/25 |
| 2014/0132210 | A1* | 5/2014 | Partovi | H02J 7/025 320/108 |
| 2014/0354074 | A1* | 12/2014 | Sadakata | H02M 1/4225 307/104 |

FOREIGN PATENT DOCUMENTS

| | | |
|---|---|---|
| DE | 10 2013 004 881 A1 | 9/2014 |
| EP | 2 664 539 A1 | 11/2013 |
| WO | 2010/129369 A2 | 11/2010 |

OTHER PUBLICATIONS

International Search Report, PCT/EP2016/058951.
N. K. Ure, G. Chowdhary, T. Toksoz, J. P. How, M. A. Vavrina, and J. Vian, "An Automated Battery Management System to Enable Persistent Missions With Multiple Aerial Vehicles," IEEE/ASME Transactions on Mechatronics, vol. 20, No. 1, Feb. 2015, pp. 275-286.

* cited by examiner

CONTACTLESS CHARGER AND BATTERY MANAGEMENT

RELATED APPLICATIONS

This application claims benefit of U.S. Provisional Patent Application No. 62/150,943, filed on Apr. 22, 2015, which is hereby incorporated herein by reference.

BACKGROUND

The present invention relates generally to contactless charging, and more specifically to devices, systems and methods related to smart batteries, battery management systems and fast charging processes.

The current energy density of batteries poses a serious limitation to the range-of-operation of unmanned autonomous vehicles, especially in unmanned aerial vehicles (UAV). Because of that, most UAVs cannot fly for a long time and cover large distances without having to land for a battery recharging. Furthermore, battery charging adds two more undesirable issues, namely, it often takes a long time and human intervention is required. Therefore battery charge implies an important constraint for various UAV applications.

Different ways of overcoming such difficulties have been presented in previous arts. For example, some recent applications (EP2664539A1, US20140032034A1, DE102013004881) use automated battery replacement as a method for automatic refueling in landing bases. This approach has several drawbacks. In the first place one has the mechanical complexity entailing the automatic replacement of battery cells and, secondly, the whole subsequent process necessary to have discharged batteries recharged, stacked and have them ready for next replacement on a cyclical basis. This complexity implies high-priced devices and, consequently, moving us away from low-end and mid-range markets.

Other applications (CN205051397U, CN204279932U) disclose base-station battery recharge units that use wireless coupling approaches. However, a key limitation of these approaches is that they do not treat fast charging batteries. In fact, high current charge rates and low charge times (for example 15 minutes or less) necessitate using both a battery management system (BMS) and a fast and reliable wireless communication channel. These points however are not properly described.

Wireless chargers are available for terrestrial and marine autonomous vehicles applications. In the case of marine vehicles contactless interface is a matter of necessity, since active electrical poles for recharging processes are not suitable for such kinds of environments. None of these solutions, however, includes the battery management system as a key element for controlling the charging process and allowing fast recharge cycles. In addition, previous approaches do not make use of the capability microprocessors in the battery management system, which can not only be used to control the discharge but also the charging processes as well. This transforms the charger apparatus into a slave, simple and low-cost device. In contrast to embodiment of the present invention, previous approaches do not make use of the electronic resources in an efficient and non-redundant manner.

BRIEF SUMMARY OF THE INVENTION

Embodiments of the present invention comprises a method and apparatus capable of managing both the charge and discharge of a battery pack. Embodiments of the invention combines the functionality of a Battery Management System (BMS) and that of a charger in a single system, thus reducing the redundancy present in the previous art. Energy transfer takes place synchronously by an opto-inductive coupling, thus enabling an effective wireless power transfer approach suitable for fast charge rates.

DETAILED DESCRIPTION

Figure 1:
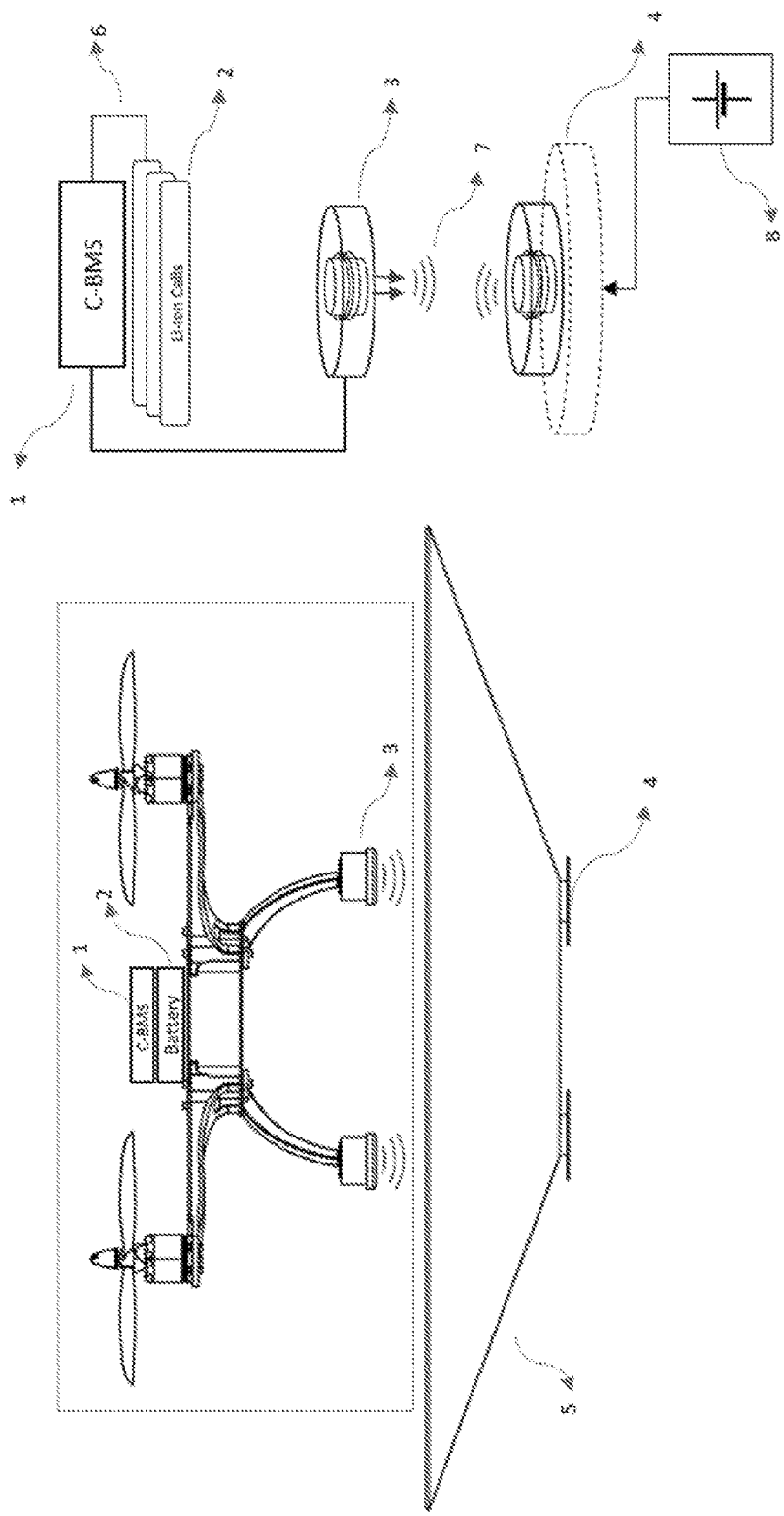
FIG. 1 illustrates an embodiment of the present invention.

A diagram showing the basic elements comprised by an embodiment of the present invention is depicted in FIG. 1. As illustrated, installed on-board an unmanned aerial vehicle (UAV) is a Charge controller Battery Management System (C-BMS) 1, battery cells 2 and one or more opto-inductive discs 3. A base form acting as guide for coil positioning 5 has incorporated one or more base opto-inductive discs 4. The interconnection between the C-BMS 1 and the battery cells 2 is shown as interconnections 6. The UAV opto-inductive discs 3 and base opto-inductive discs 4 are coupled through a magnetic and optical link 7. A DC power source 8 is coupled to base opto-inductive discs 7. DC power source 8 may be connected to an external power source such as an AC voltage source, or it may have its own power source as, for example, a pack of batteries cells, or both.

Figure 2:
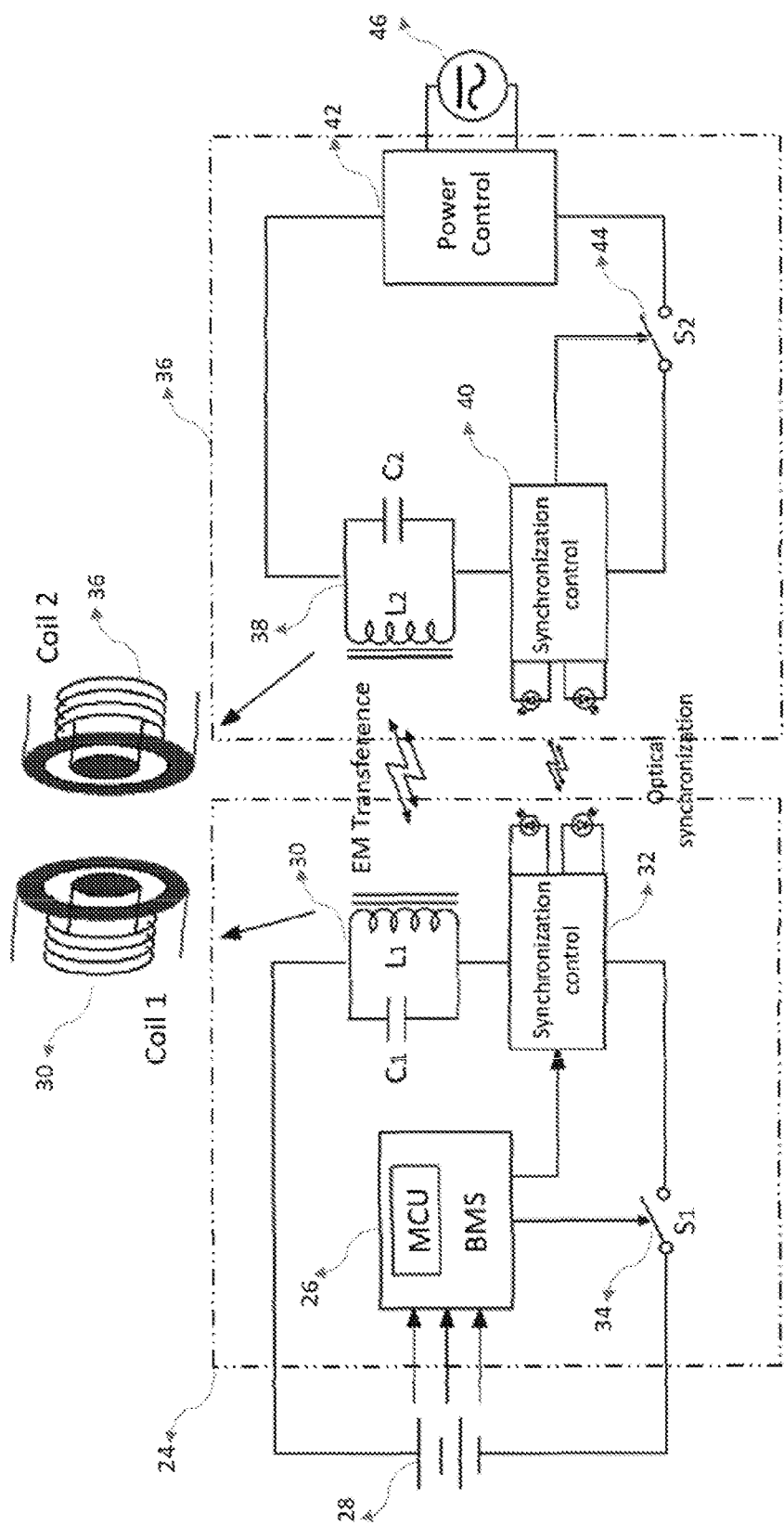
FIG. 2 illustrates electronic circuits contained in an embodiment of the present invention.

A more detailed description of the electronic circuits comprised by charger and BMS is shown in FIG. 2. The sub-circuit that appears at the left 24 contains the control unit, denoted as "BMS" 26, battery cells 28, a secondary coil of the inductive device 30, the opto-communicating circuit 32, and a switch 34. The sub-circuit at the right 36 comprises the primary coil of the inductive coupling device 38, the opto-communicating circuit 40, the power control unit 42, and a switch 44. A power source 46, which may be external to the two previously mentioned circuits, completes this diagram. Optionally, this power source can be included within 36 in the form of a battery pack and its charger unit which is not shown in this figure.

The BMS unit 26 controls the battery charging process by switching switch 34 and switch 44 in an alternative manner through the control of the opto-communicating circuits 32 and 40. This is carried out by switching off switch 34 and simultaneously switching on switch 44 during a first period of time T1, thus energizing coil 38. Afterwards, during a period of time T2, switch 34 is switched on and switch 44 is switched off allowing energy in coil 38 to be transferred to coil 30, and so charging the battery 28. The sum T=T1+T2 constitutes a complete period, wherein a specific amount of energy is transferred to batteries. Alternatively and in some embodiments a third state T3 (T=T1+T2+T3) is needed in which switch 34 and switch 44 are both switched off. For example state T3 may be used in the 'REPOSE' mode described below. The duty cycle is dependent of the voltages of the power source and battery.

Once the desired energy flux direction is established, the duty cycle on the correspondent coil side must be long enough to energize it, and to deplete its energy on the opposite side. The duty cycles on the primary and secondary side must be dynamically adjusted according to the predefined current rate, battery voltage and power source voltage, apart from the energy flux direction. In the T3 'REPOSE' state, both switches must be opened to avoid energizing any of the coils and to prevent short circuits.

For applications demanding lower charge currents, the described circuit for energy transfer can be simplified using fast recovery high voltage rectifiers in the secondary part instead of synchronous switch 34.

The active management of the charging process by the BMS allows for fast charging rates. Normally fast recharges are considered those with rates equal or higher to 1 C, which is the charge current needed to charge a battery in 1 hour. Because the BMS monitors each cell, its temperatures and balance, and its state of charge, it can control a high constant charge current throughout the charging process.

Regular chargers can only detect the external voltage terminals of the battery and can't determine what part of that voltage is caused by the internal impedance of particular cells and the current flowing through them, so they need to finish the charge cycle with a constant voltage. This means that the charge current decreases asymptotically at the end, producing charge cycles of more than three hours in some cases.

Charging rates are characterized by Battery University (batteryuniversity.com/learn/article/ultra_fast_chargers) according to the following table:

| Type | Chemistry | C rate | Time | Temp. | Charge termination |
|---|---|---|---|---|---|
| Slow charger | NiCd Lead acid | 0.1 C | 14 h | 0° C. to 45° C. | Continuous low charge or fixed timer. Subject to overcharge. Remove battery when charged. |
| Rapid charger | NiCd, NiMH, Li-ion | 0.3-0.5 C | 3-6 h | 10° C. to 45° C. | Senses battery by voltage, current, temperature and time-out timer. |
| Fast charger | NiCd, NiMH, Li-ion | 1 C | 1 h+ | 10° C. to 45° C. | Same as a rapid charger with faster service. |
| Ultra-fast charger | Li-ion, NiCd, NiMH | 1-10 C | 10-60 min. | 10° C. to 45° C. | Applies ultra-fast charge to 70% SoC; limited to specialty batteries. |

In a preferred embodiment of the present invention, charge rates of approximately 1 C or greater are achieved, putting the device into the "fast" or "ultrafast" categories according to the above table.

Aside from unmanned aerial vehicles, the invention has applications in other unmanned autonomous vehicles, and other vehicles, where smart energy management and fast charge rates are needed. Marine robotics is a key application field for embodiments of the proposed invention, due to the electrical isolation required in the charge processes and the need for high density power management and control in constrained spaces and weights.

Embodiments of the invention also have applications in industrial plants and home robots, where frequent automated recharges are needed. Its scope also includes sanitary or other types of special facilities, where handheld and other battery-operated equipment need fast recharges in a simple process, with little human intervention, avoiding the manipulation of non-isolated electric elements and complying with strong safety requirements and restrictions.

Embodiments of the invention also can be used in manned vehicles, for example in the electric bikes or motorbikes charge process and battery management.

Description of the Battery Management and Power Control Module

The power control module is a device with protection and monitoring capabilities for lithium battery packs with integrated power control of state of charge and current, all managed by an unique advanced algorithm that controls both charge and discharge rates. Lithium batteries, in contrast to traditional lead acid batteries, need control and protection electronics to determine its state in each moment to avoid damage to the internal chemistry, avoid reduction of the battery life and lower the risk of accidents that may involve fire or explosion risk.

The disclosed module monitors and controls the following elements:
1. Charge and discharge currents, avoiding the maximum rates allowed by the cell manufacturer or the equipment connected to batteries.
2. Charge and discharge voltages, avoiding the maximum or minimum cell voltage levels recommended by cell manufacturers.
3. Temperature of cells and battery pack, avoiding the risk of thermal runaway.

The device calculates, through a precise instrumentation and numerical processing of the read data, the following parameters of the battery:
1. State of charge (SOC) of each cell and the entire battery pack.
2. State of health of the battery (SOH).
3. Unbalances between energy in cells.

To extract the maximum amount of energy of a battery pack all cells are preferably connected in series and energy is preferably balanced among the cells. To accomplish this, the state of charge (SOC) of the cells should be as close as possible at all times thus avoiding the interruption of the discharge process of the whole pack which occurs when one of the cells reached its minimum voltage before the rest.

Key innovations of embodiments of the present invention include modularity and scalability, small volume and low weight even considering the high power capabilities of the system, making it suitable for unmanned autonomous vehicles and lightweight electric vehicles, where limited space and weight are key elements.

Embodiments of the present invention have a flexible and scalable design, through the stacking of circuit boards, lowering the surface and optimizing space. With communication buses and analog signal transfer between them, each board has a specific function, described below:

Embodiments of the present invention include a stack of integrated circuit boards with connectors for the interconnection of these boards comprising the following elements:
1. A power module, comprising at least one power board, whose function is switching the power path between the charger and the battery ground and measuring the charge and discharge currents;
2. A control module, comprising at least one control board with data processing capabilities responsible of the management of the whole device;
3. A cell monitoring and balancing module, comprising at least one cell monitoring and balancing board, whose function is measuring the voltages of each cell of the battery pack and each cell's temperature through one or more temperature sensors.

The board stacking, and particularly, the number of power boards and the number of cell monitoring and balancing boards, are configurable to adapt the device to the maximum voltage and maximum current of the battery pack, where the power board stacking is done through their parallelization to augment the maximum current capability, and the cell monitoring and balancing board stacking is done by serializing them thus augmenting the maximum voltage reachable.

The printed circuit board stacking can include auxiliary modules comprised by at least one auxiliary module board with additional functions to those described above. Each power board contains preferably two independent circuits for the charge and discharge of the battery, a charging circuit with a charge current measuring sensor and a discharge circuit with a discharge current measuring sensor. The charge current measuring sensor comprehends a charge shunt resistor and the discharge current measuring sensor comprehends a discharge shunt resistor.

The control board can comprise a data processing microcontroller unit (MCU) and preferably can comprise driver circuits for the power switching stage.

In alternative embodiments, the control board may include a load and charger detector, which function is to receive signals from the power board charger and load terminals and determine if there is some load or charger connected to the battery.

Each cell monitoring and balancing board can comprise a cell monitoring integrated circuit which function is to measure the cell voltages of their relative part of the battery pack and an opto-isolator interconnecting this cell monitor to the connector which interconnects with other boards in the stack.

Figure 3:
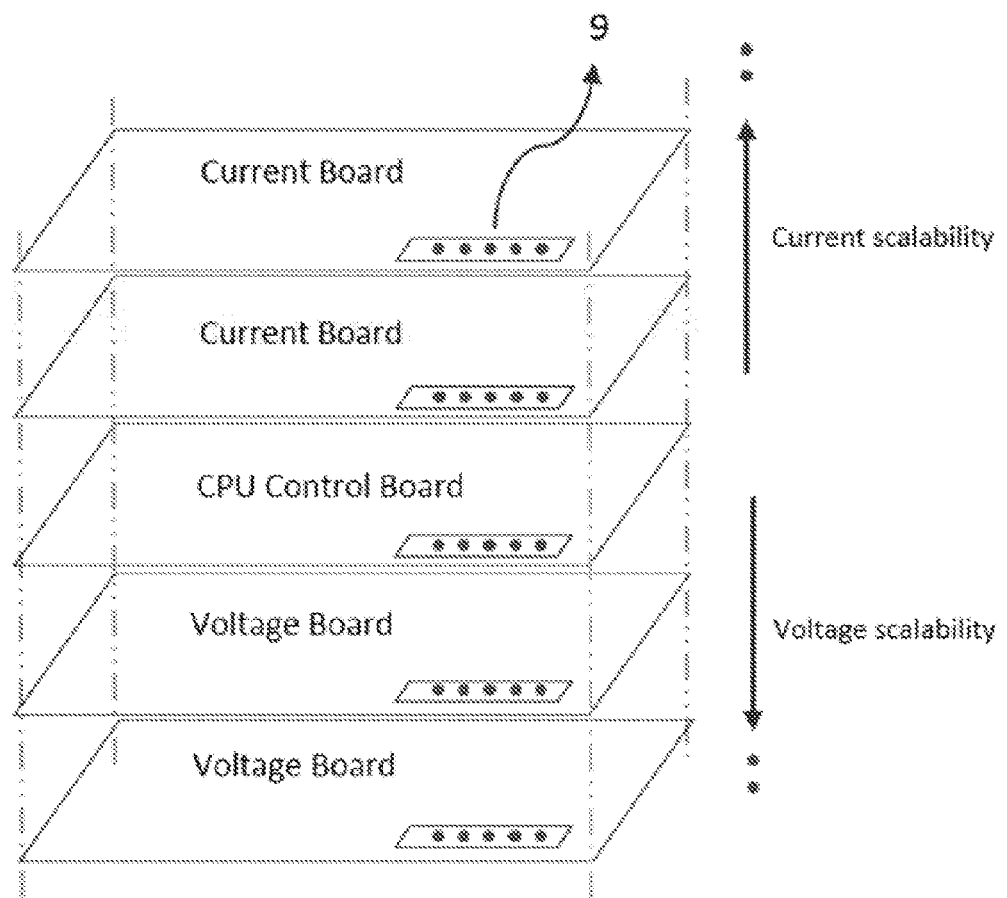
FIG. 3 illustrates a circuit board arrangement used in an embodiment of the present invention.

Stacking the circuit boards described before, each one with its own functionality, the battery management with power control is formed as a complete unit, as is shown in FIG. 3.

FIG. 3 shows schematically the configuration of the battery management and power control device through board stacking. The board to board intercommunication bus 9 connects the boards together.

Embodiments of the current boards, or power modules, comprise battery power input/output switches and current sensors. Embodiments of the control module comprise a microcontroller unit (MCU), signal conditioning circuits, switch control circuits, and fast protection circuits. Embodiments of the voltage boards, or monitoring and balancing boards, comprise cell monitoring circuitry, temperature sensing circuitry and balancing circuits. Auxiliary boards (not shown) may comprise communications circuits, data display circuitry and external memory modules.

Boards that can be stacked are: one or several current boards, one CPU control board, one or more voltage boards and optionally one or more auxiliary boards, all of them connected through connectors. This configuration is compact, saves space and weight, and is very flexible for different configurations.

Figure 4:
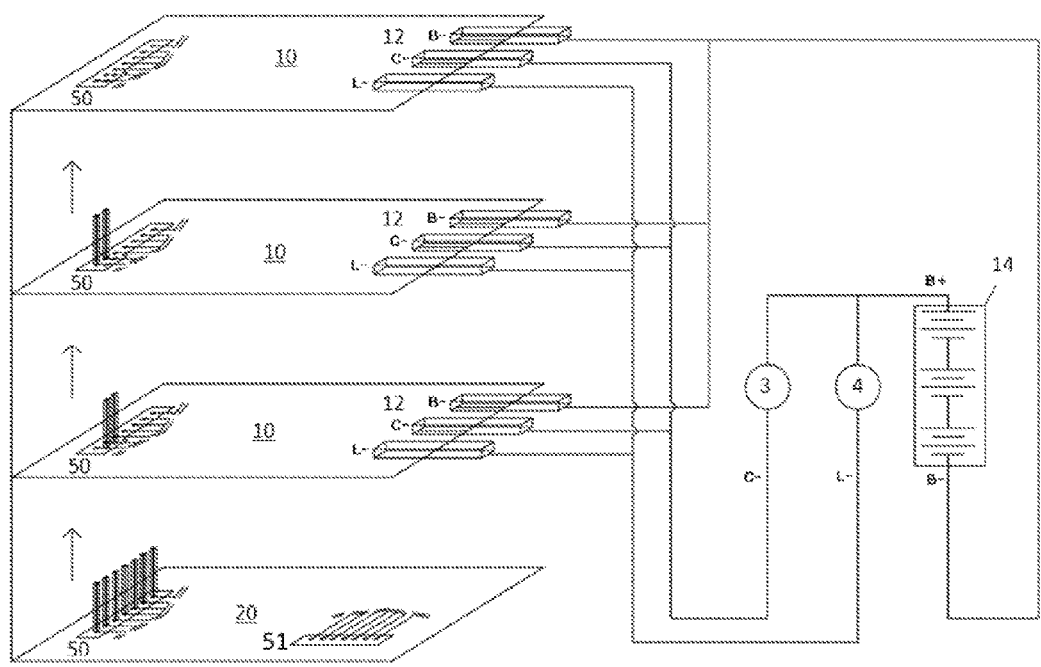
FIG. 4 illustrates the power board staking employed by battery management system in an embodiment of the present invention.

FIG. 4 illustrates the current board stacking concept, in which the current board 10 are stacked, scaling the current (and thus power) capabilities of the device, in a direct way and all integrated in the same device.

FIG. 4 also illustrates the relative position and connection to the control board 20 and the main connectors between boards (50, 51). Also are shown the possible connection of the power boards of the device to the battery 14, through the power bus bars 12, with:
1. The low side of the charger coil, terminal C−, through which the charge process is controlled.
2. The low side of the load, terminal L−, through which the discharge process is controlled.
3. The battery ground terminal, B−.

The power bus bars are an effective way of reduce weight and volume, acting as high current conductors and dissipation elements (heat sinks) at same time, and acting as external power connector just with screw terminals without the need of high weight and expensive power connectors.

The current board stacking and parallelization ad some other advantages as:
1. Simple way to escalate current to high power.
2. At the same time, power transistors are parallelized but also the dissipation elements and power conduction elements, like power buses and PCB traces.
3. Current flow path divide in similar parts to each board, thus lowering exponentially the power dissipation of measuring shunt resistors.

Figure 5:
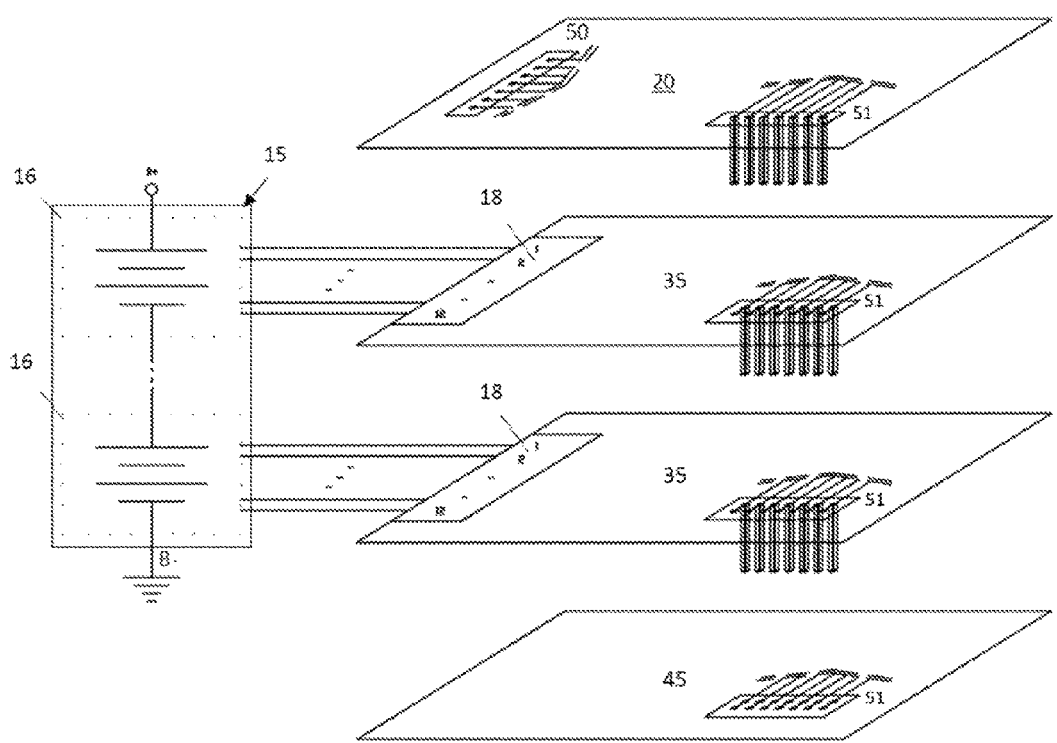
FIG. 5 illustrates cell monitoring and balancing boards stacking used in an embodiment of the present invention.

Cell monitoring and balancing (voltage) boards can be directly stacked as well, according to the needs of the voltages of the battery pack. In FIG. 5 the stack structure of these boards 35 are shown. In the same figure, the interconnection with the control board 20 through connectors 51 is shown. Each cell monitoring and balancing board 35 is also connected to a group of cells 16 of the battery stack 15 through a cell connector 18. Also shown is auxiliary board 45.

Figure 6:
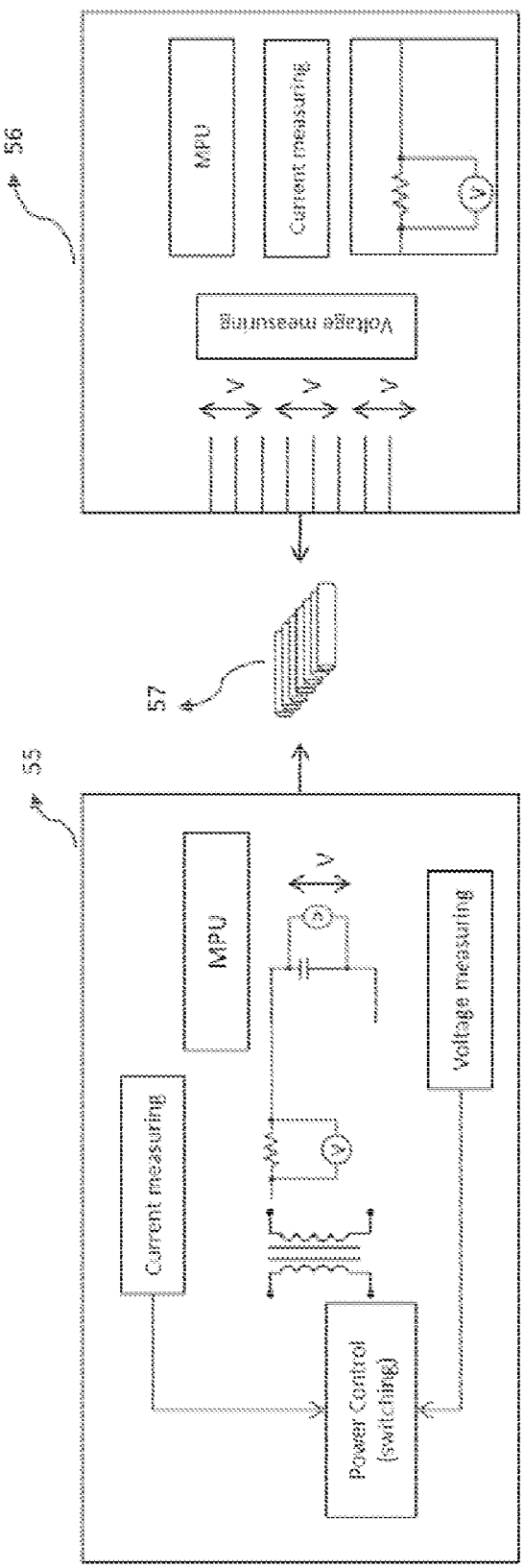
FIG. 6 illustrates a prior art embodiment of a charging system.

FIG. 6 illustrates a prior art approach to charging. Traditional charging unit 55 may include power control circuitry as well as voltage and current measuring circuity and may include a microprocessor unit (MPU). Batteries 57 are charged through the operation of traditional charging unit 55. Traditional battery management system 56 may include current measuring and voltage measuring circuity to manage the discharge of batteries 57.

Figure 7:
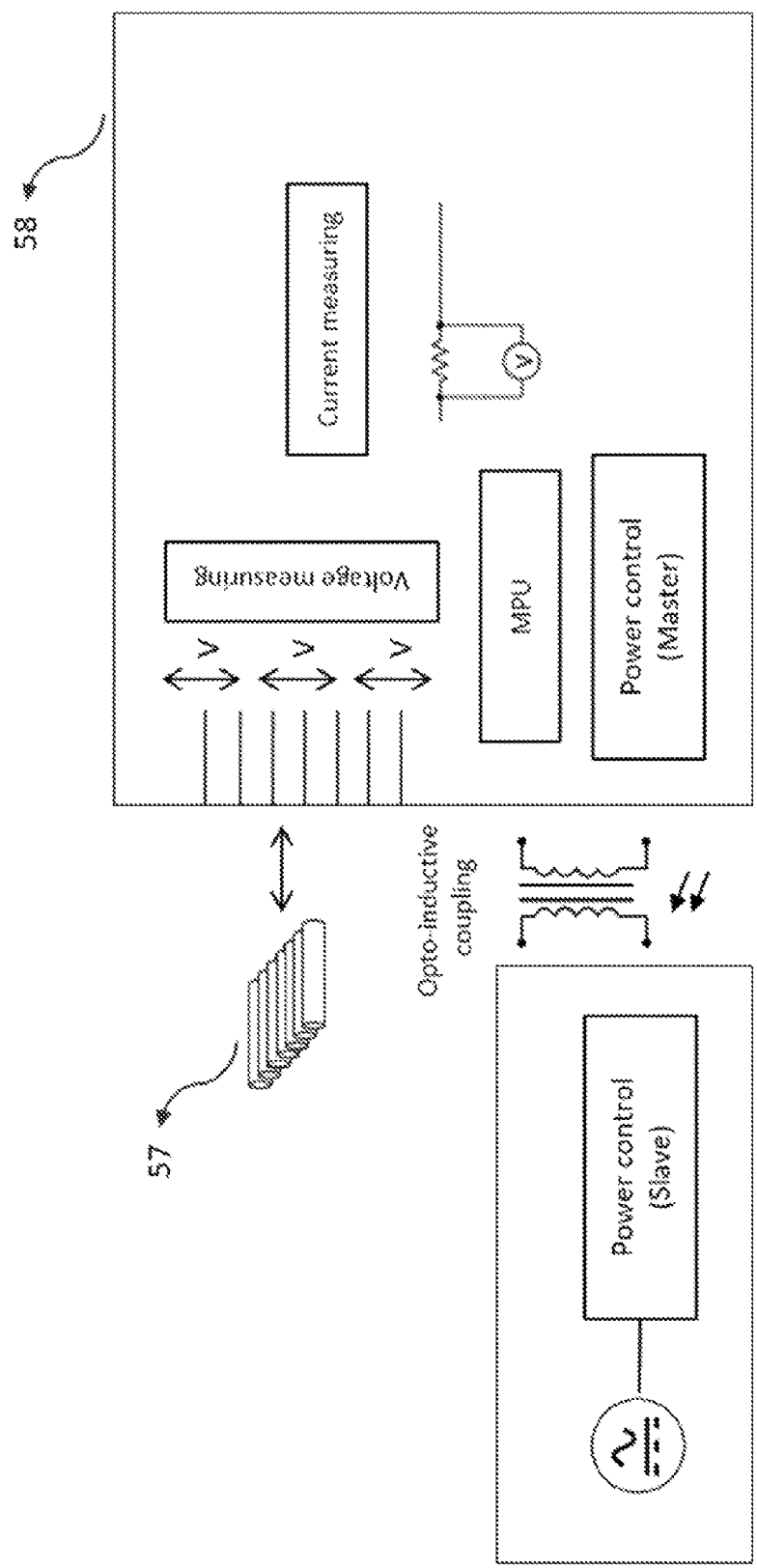
FIG. 7 illustrates an overview of embodiments of the present invention.

In contrast to FIG. 6, FIG. 7 illustrates an overview of embodiments of the present invention. The Charger and battery management system (C-BMS) 58 according to embodiments of the present invention manages the charging process through the use of the opto-inductive coupling as described above. The power source acts as a slave device to the C-BMS system and the microprocessor unit (MPU) in the C-BMS system controls the charging of batteries 57 as well as monitors the discharging process.

UAV with Landing Platform

This section describes an automatic landing station and battery recharge system to which the above described mechanism are applied in an embodiment of the invention.

The description described the battery management and energy transmission and its control applied to unmanned aerial vehicles (UAVs) li-ion batteries. Now a complete automatic system is described, including the mechanical elements to allow the simplification of the landing stage of remotely operated UAVs, or even total autonomous operation.

Above we described the technology of charging drones or other autonomous electric vehicles, combining the Li-Ion battery management system needed for fast, safe and automatic recharging processes and the intelligent charger, all in only one system (named Charge Controller BMS or C-BMS). For the transference of energy, we illustrated and described the use of one or several opto-inductive discs, that is, the use of coils embedded in magnetically conductive materials, such as ceramics compounds FeMn/NiZn and infra-red light emission LEDs.

Figure 8:
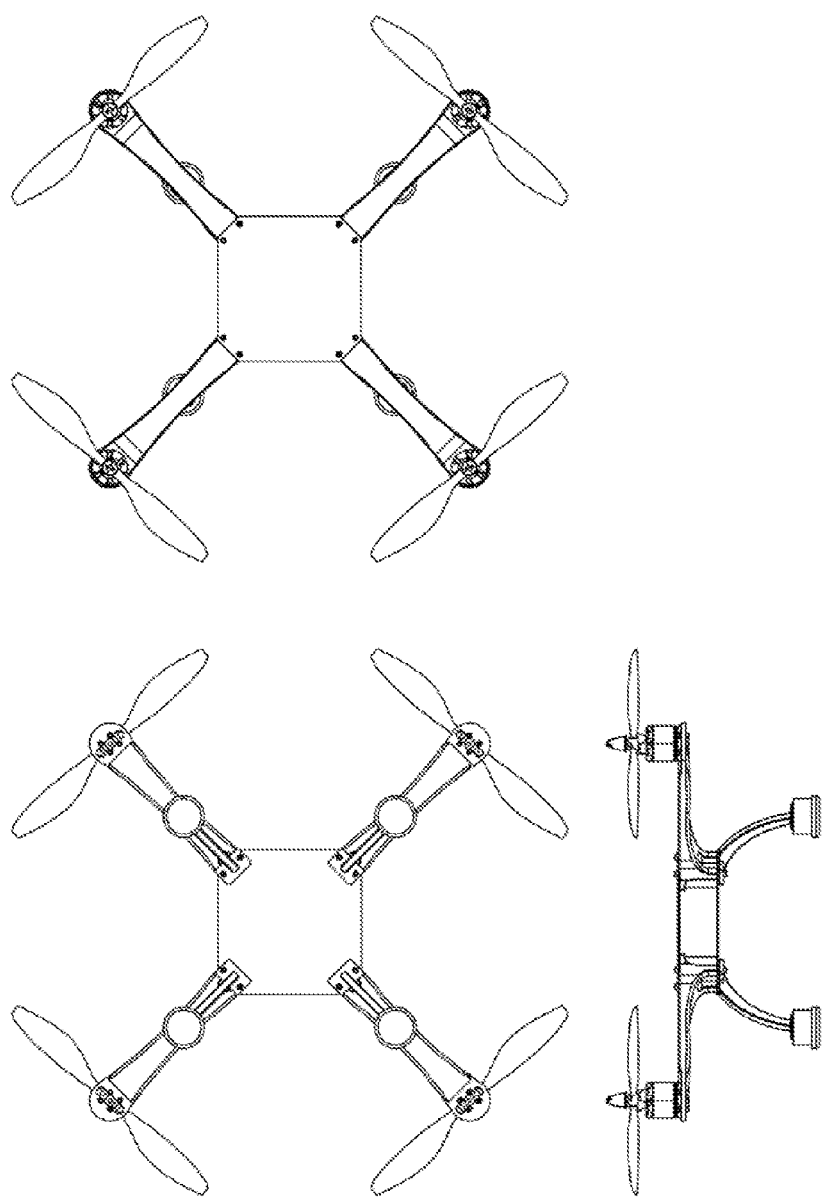
FIG. 8 illustrates a UAV with opto-induction discs located in the landing legs in an embodiment of the present invention.

As illustrated in FIG. 6, FIG. 7 and FIG. 8, the previously described opto-induction discs are positioned in the extreme of the landing legs of the drone or autonomous vehicle, simplifying the wiring scheme, allowing the use of up to four or even more opto-inductive discs (in the case the vehicle has more than four legs), thus, easing the scalability of the recharging power and optimizing the space, due to the limited room that aerial vehicles have in their main frame.

This approach has other advantages, such as improved dissipation. As we can see in the above mentioned figures, the upper cylinder of the opto-induction discs acts as the mechanical fastener to the drone leg but also as the dissipation element using aluminum of other good thermal conductor. This method separates the heating elements from the main body of the aircraft improving its heat exchange.

Each opto-induction disc has the main power cables connected to battery through the Charger controller-BMS and the signal cables. These signal cables provide the pulse width modulated (PWM) signals that the C-BMS sends to synchronize each charge pulse. As described above, in each pulse a discrete amount of energy is charged in the resonant circuit formed by the drone opto-inductive disc and base opto-inductive disc, and transmitted between both, allowing the control of the amount of energy transmitted by increasing or decreasing the PWM duty-cycle by the C-BMS algorithm. By using four opto-induction discs located in the legs of a drone, distributing regularly the PWM pulses between them is possible (phase-shifting the PWM pulses 90° in the predefined period) thus the discharge of the coils to the battery are softened to a much more constant charge current flow.

Because the receptors are simple and direct switched, we can escalate power for charging by just adding more transceivers, all controlled by the same BMS. Thus, more than four legs and more than one transceiver per leg is possible in certain embodiments. This scalability feature may be an important factor in high power applications.

Part of an embodiment of the invention described in this manuscript is the method to mechanically guide the drone and their opto-inductive discs to a desired position inside a recharge base station, simplifying the approach and landing process of a human operator or allowing a complete automatic landing and recharge in autonomous systems.

Regarding the control of the charging process, in an embodiment of the invention, the BMS algorithm has a state machine such that when it detects that the discharge current is above a threshold, its sets the to 'ACTIVE' and shuts down the LEDs and doesn't try to find the base/charger. When the current is below that threshold, the BMS enters a 'REPOSE' state, but after a period of time, when the batteries pass their transient, the BMS enters a 'STABLE REPOSE' state and send a burst of low duty cycle PWMs LED pulses. If it detects charge current in response, it changes to a 'CHARGE' state and will increase the duty cycle of the PWMs LED pulses to get full charge current.

Figure 9:
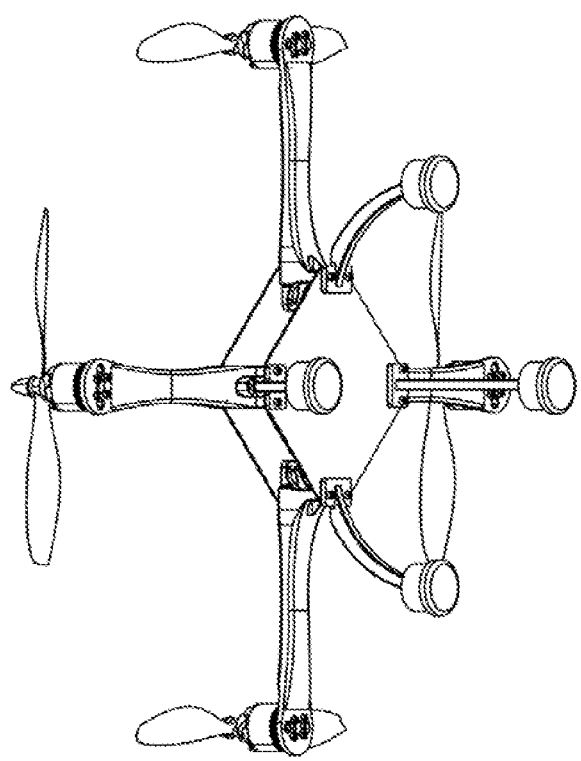
FIG. 9 illustrates a UAV with opto-induction discs located in the landing legs in an embodiment of the present invention.
Figure 9:
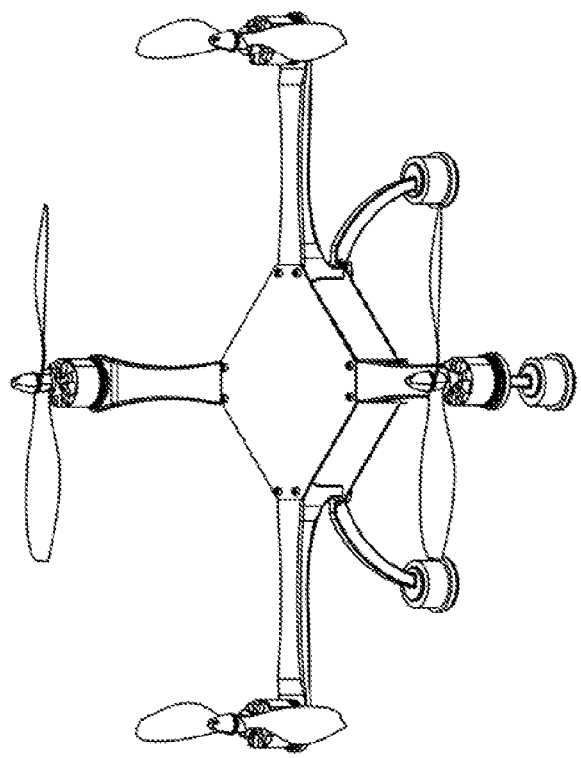
Figure 10:
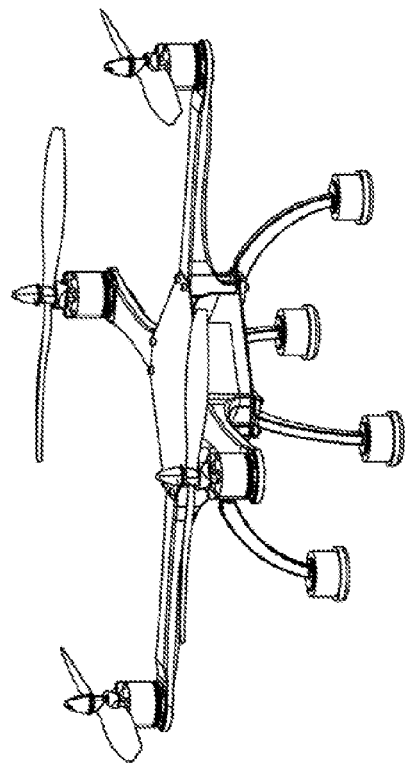
FIG. 10 illustrates a UAV with opto-induction discs located in the landing legs in an embodiment of the present invention.
Figure 10:
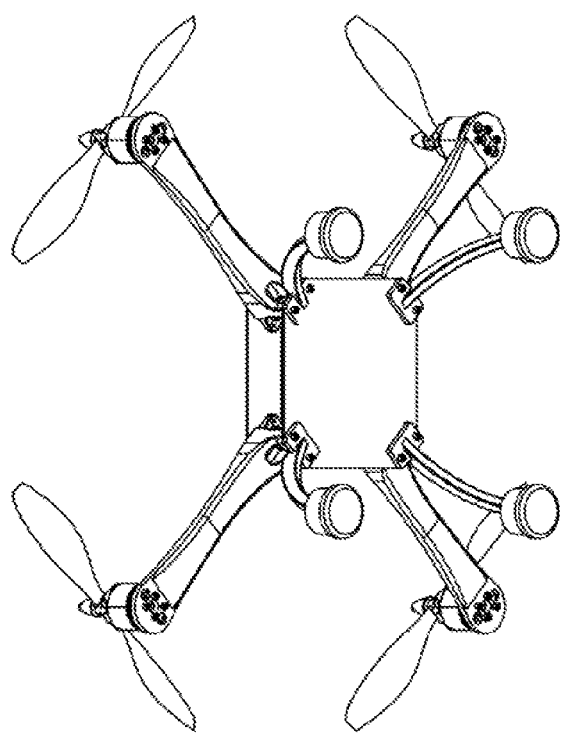
Figure 11:
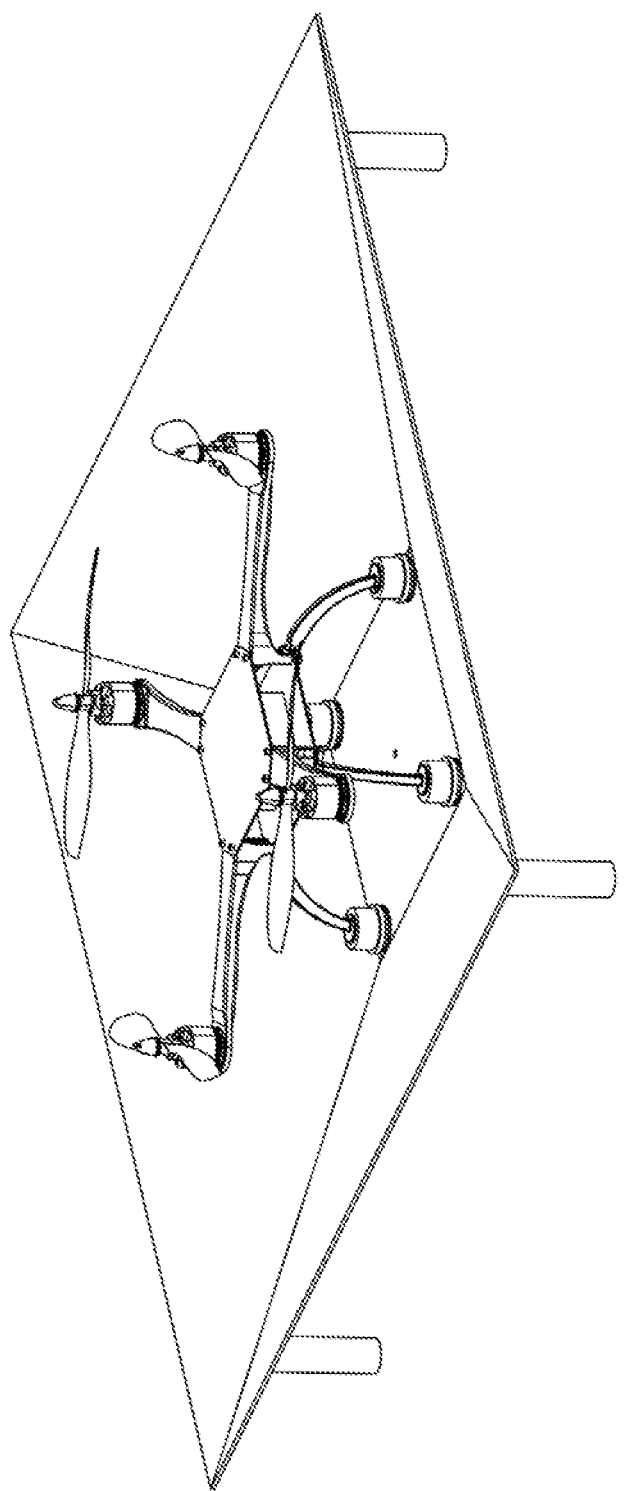
FIG. 11 illustrates a UAV and a platform incorporating opto-induction discs in an embodiment of the present invention.
Figure 12:
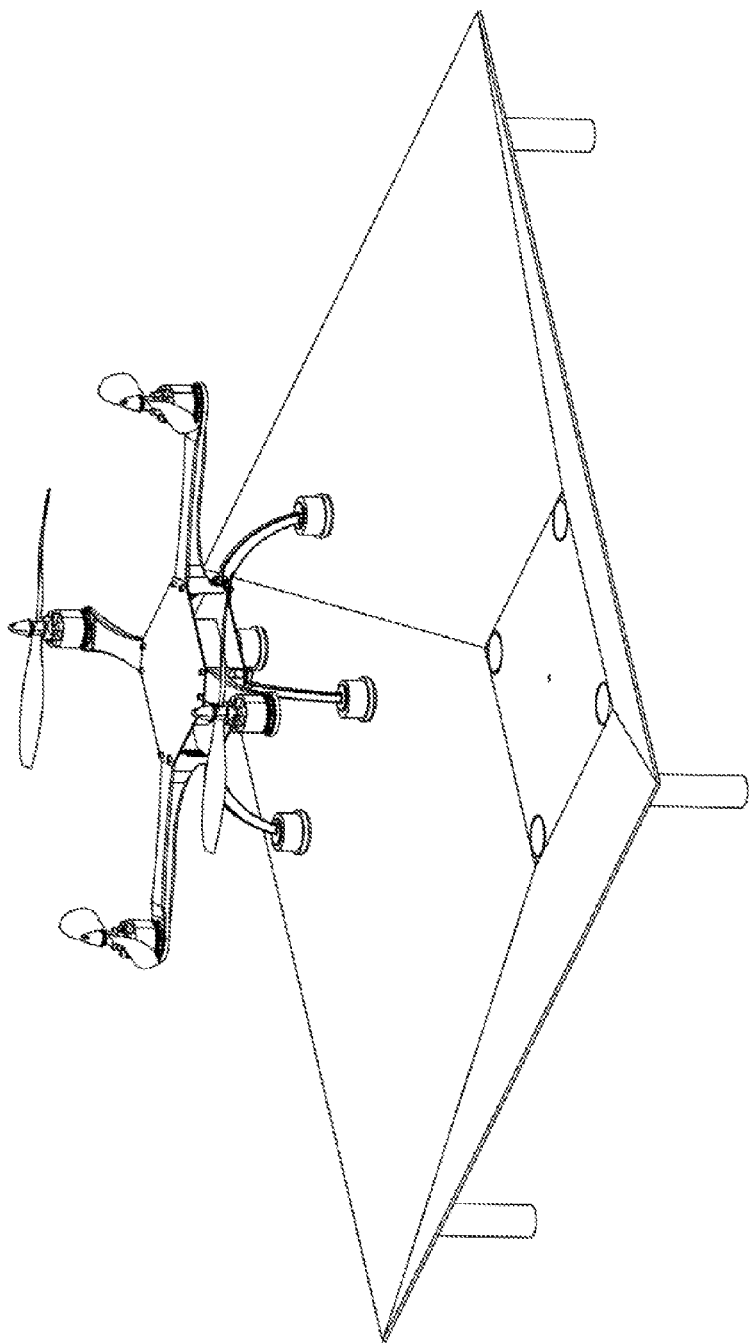
FIG. 12 illustrates a UAV and a platform incorporating opto-induction discs in an embodiment of the present invention.

FIG. 9 and FIG. 10 illustrate a UAV and accompanying landing platform in an embodiment of the invention. FIG. 11 and FIG. 12 illustrate the landing platform. This platform, or recharge base station, or base, also has receiver induction discs, and they are similar to the drone induction-disc, including coils and magnetic conductive ceramic compound and infra-red receptor elements too. Their number and location is determined by the drone opto-induction disc position in legs, for example if the drone has four legs separated by a known distance, the base opto-inductive disc receptors will be also four, separated with the same distance and arranged in the same form.

To mechanically simplify the landing and precisely guide the drone to its charger position (where the opto-induction discs are aligned and their respective IR-emitter and IR-receptor are centered), four plastic or other slow friction material walls are placed in a determined angle with respect to the horizontal plane, forming a square funnel as illustrated in the above mentioned figures. The opto-inductive landing legs of the drone slides through these angled walls of the funnel to the center position where the transmission charge occurs.

The opto-induction discs located in the base, are disposed in the same distance between them as the drone legs determine. These opto-induction disc are embedded in the horizontal part of the base so the upper plane of each ceramic compound and coil disc are perfect aligned with the upper plane of the base station ground. An isolation and protective film or glass can be added to this arrangement, also permitting the correct sliding of the opto-isolation discs on the legs of the drone to its centered position. These film or glass is transparent to infrared light frequency, so the communication between the circuits is possible.

Figure 13:
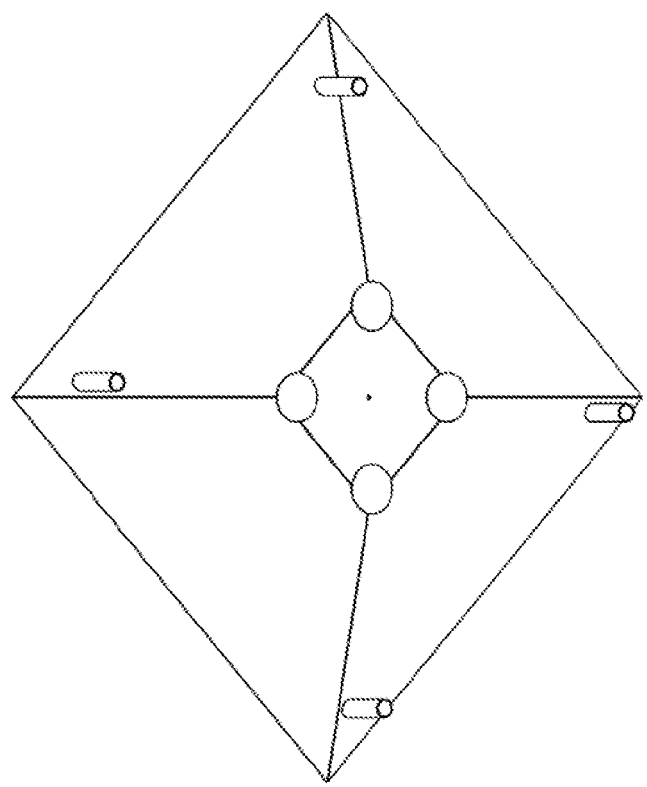
FIG. 13 illustrates a platform incorporating opto-induction discs in an embodiment of the present invention.
Figure 13:
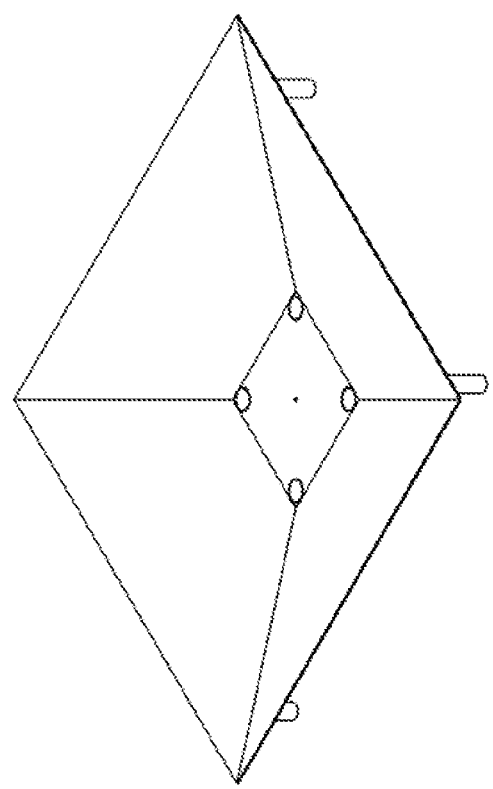
Figure 14:
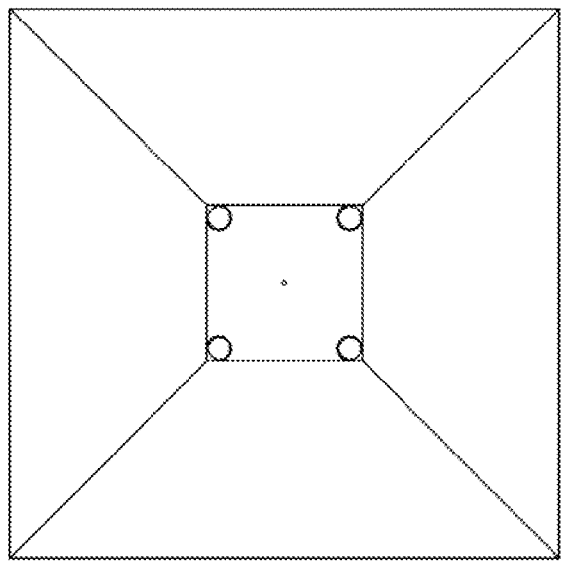
FIG. 14 illustrates a platform incorporating opto-induction discs in an embodiment of the present invention.
Figure 14:
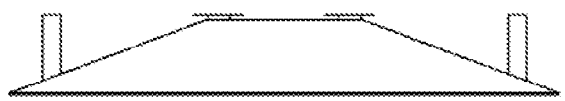
Figure 14:
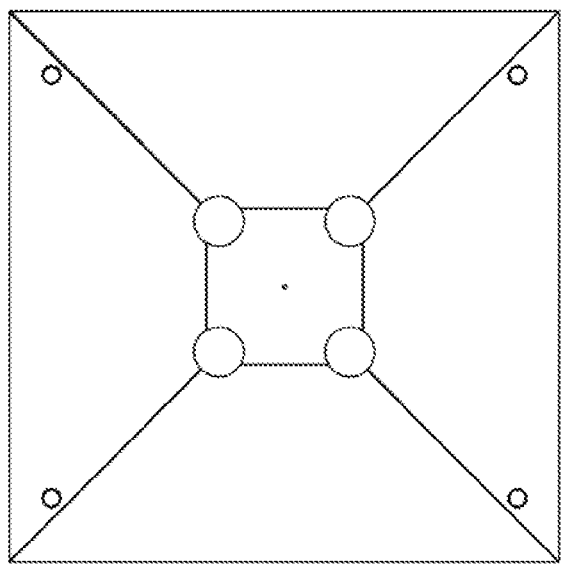
Figure 15:
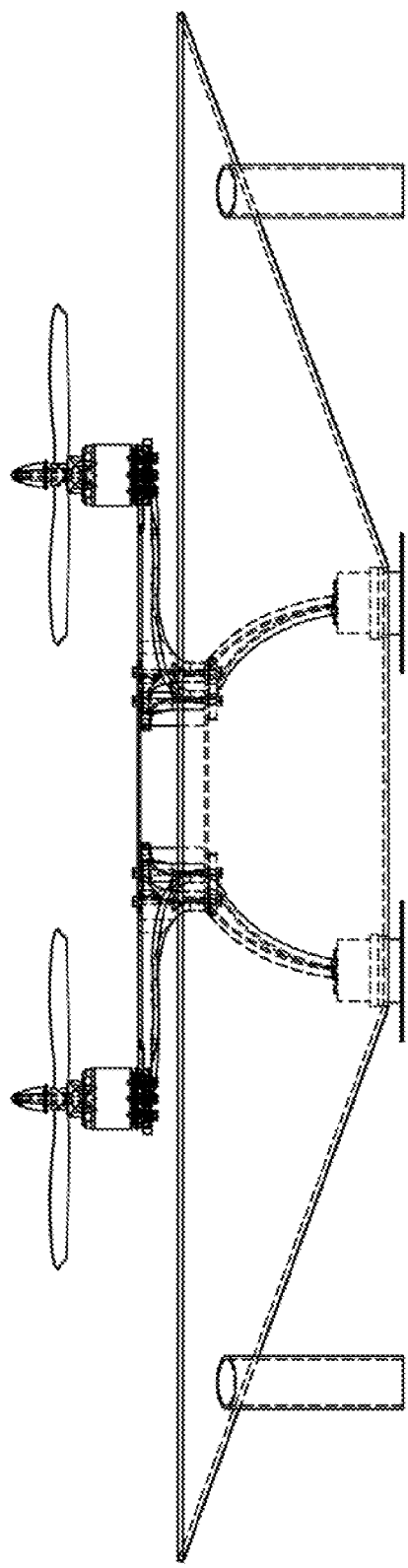
FIG. 15 illustrates a UAV and a platform incorporating opto-induction discs in an embodiment of the present invention.
Figure 16:
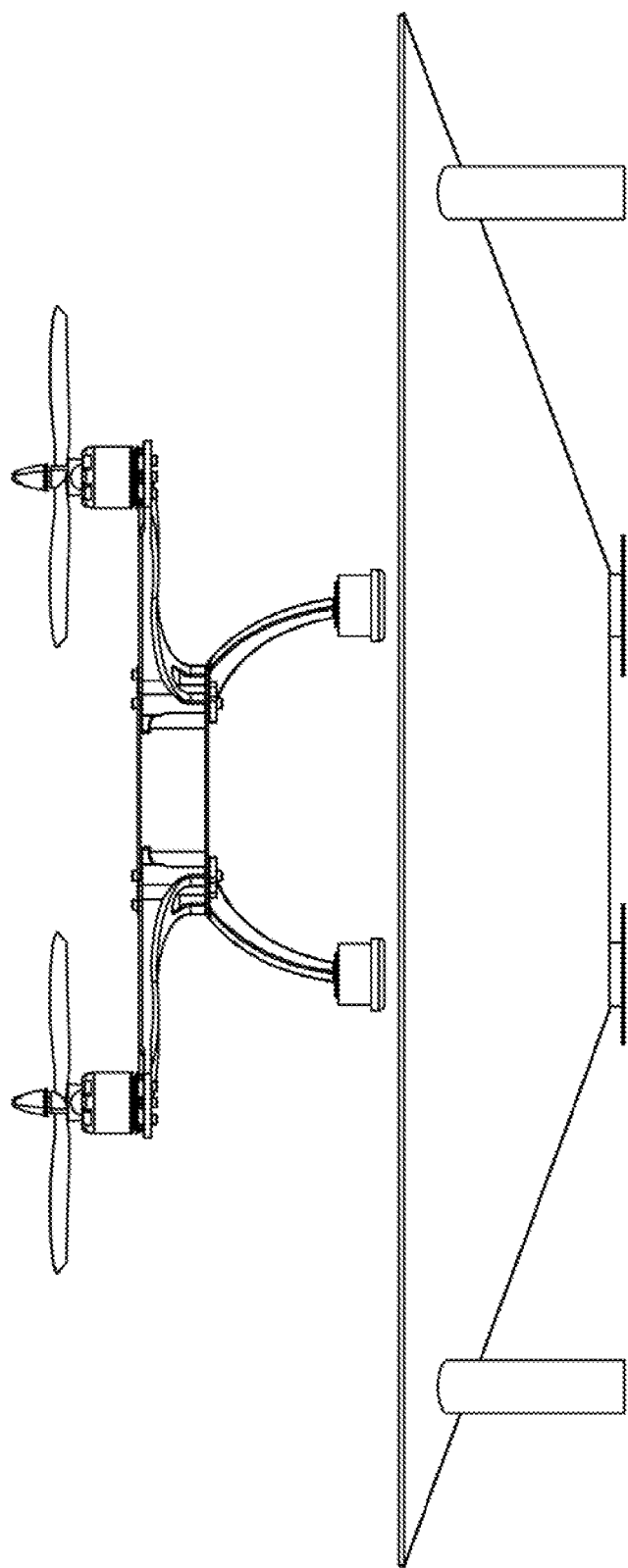
FIG. 16 illustrates a UAV and a platform incorporating opto-induction discs in an embodiment of the present invention.
Figure 17:
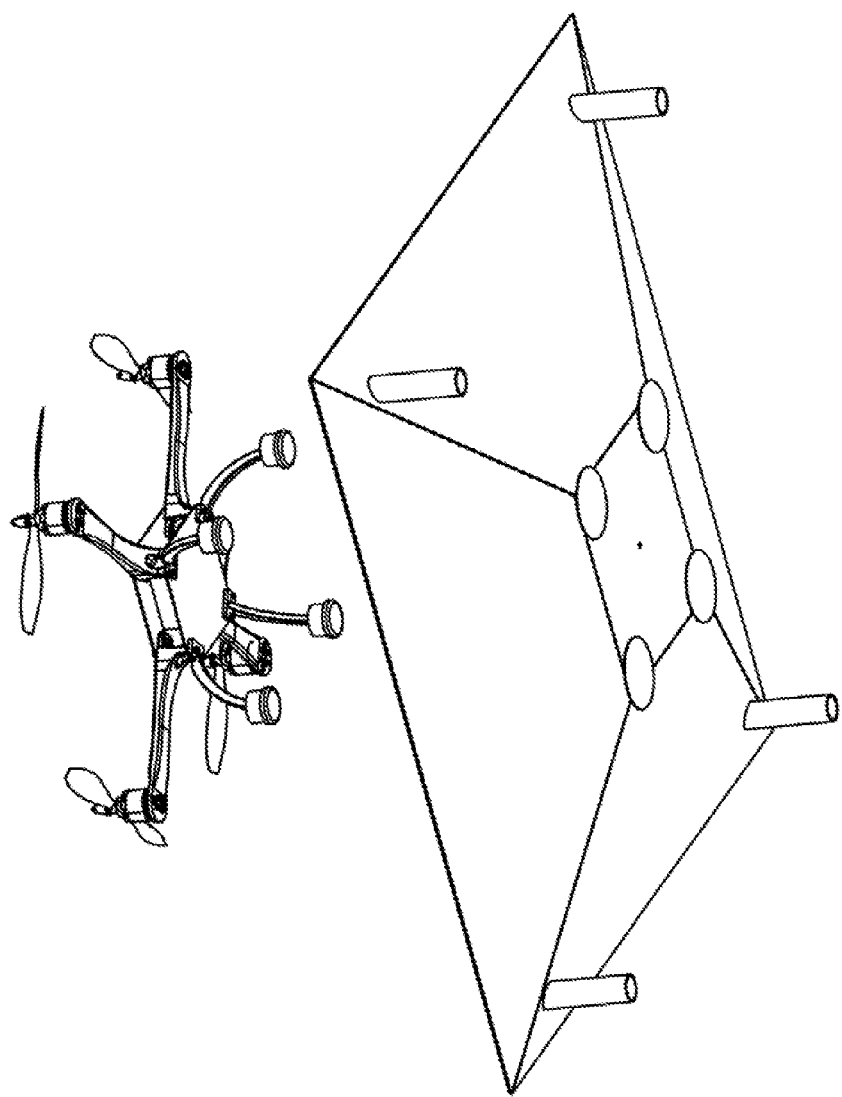
FIG. 17 illustrates a UAV and a platform incorporating opto-induction discs in an embodiment of the present invention.

Some key fastener elements of the base are shown in FIG. 13, FIG. 14 and FIG. 15, to attach the base to the ground and give stability to the whole device.

The system discussed above can be utilized with a variety of different types of power sources on the base station side. In fact, the base station can be connected directly to solar panels for example, with different voltages, 24V, 36V, 48V, etc. In contrast, systems that employ direct contact with metallic pads, the base would need to be connected to a lithium charger, and couldn't be connected directly with DC sources of different voltages. This advantage is important because in isolated applications, such as on a rooftop, the present system can connect to high voltage solar panels configurations, and extract energy applying MDPT algorithms. Also note that a direct contact charging system does not solve the balancing problem needed to have complete recharge automation.

Applications for the present invention include marine applications, for example monitoring and surveillance bases located on land, boats, or floating platforms. Other examples include fishing applications and control of docking maneuvers for ships for which drones will provide extensions of the field of view.

Regarding the extended field of view in marine or other applications, one could think of several bases with small drones some flying while others recharging with the entire process automated, while operators of various types of machinery (e.g., cranes, docking boats) receive aerial views from several points of view.

In addition, routine surveillance of large areas, farms, pipelines (e.g, using distributed sets of the bases for recharging)—with periodic and automating photographing of different point for data analysis, interpretation and decision making.

Drones for transporting goods or cargo with intermediate points of recharge at land, sea or rivers could also be employed. Other applications include: automated cleaning of solar photo-voltaic panels or other hard to reach or delicate surfaces; agricultural applications; and telecommunication applications, e.g., providing continuous cell phone coverage with some drones flying with others are recharging.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The invention claimed is:
1. A system comprising:
a stationary unit comprising:
 a power source;
 a first inductive device coupled to said power source;
 a first control unit comprising an opto-communicating circuit; and
 a first switching circuit coupled to said power source and to said first inductive device, wherein said first switching circuit is controlled by said first control unit to transfer energy from said power source to said first inductive device;
a mobile unit comprising:
 one or more batteries;
 a second inductive device coupled to said batteries, wherein said second inductive device is capable of receiving energy from said first inductive device when said first inductive device and said second inductive device are in proximity;
 a second control unit comprising an opto-communicating circuit, wherein said second control unit communicates with said first control circuit when said first control unit and said second control unit are in proximity;
 a second switching circuit coupled to said batteries and to said second inductive device, wherein said second switching circuit is controlled to transfer energy from said second inductive device to said one or more batteries;
 a battery management system coupled to said batteries, to said second control circuit and to said second switching circuit;
wherein said battery management system controls said second switching circuit and controls said second control circuit to communicate with said first control circuit to control the transfer of energy between said first inductive unit and said second inductive unit, and wherein said battery management system causes said first switching circuit to be activated and said second switching circuit to be deactivated during a first time period, and causes said first switching circuit to be deactivated and said second switching circuit to be activated during a second time period.

2. The system of claim 1 further comprising a battery monitoring unit that monitors the state of said one or more batteries and wherein said battery management system further monitors the discharging process when said first inductive device and said second inductive device are not in proximity.

3. The system of claim 1 wherein said battery management system comprises a microprocessor and program code that controls the operation of said battery management system.

4. The system of claim 1 wherein said battery management system controls the timing of said first switching circuit and said second switching circuit so that said one or more batteries are charged at a rate of approximately 1 C or greater.

5. The system of claim 1 wherein said mobile unit is part of an unmanned aerial vehicle (UAV) and said stationary unit is part of a landing platform.

6. A system comprising:
a stationary unit comprising:
 a power source;
 a plurality of first opto-inductive transceivers, each comprising:
  a first inductive device coupled to said power source;
  a first control unit comprising one or more opto-communicating circuits; and
  a first switching circuit coupled to said power source and to said first inductive device, wherein said first switching circuit is controlled by said first control unit to transfer energy from said power source to said first inductive device;
a mobile unit comprising:
 one or more batteries;
 a plurality of second opto-inductive transceivers, each comprising:
  a second inductive device coupled to said batteries, wherein said second inductive device is capable of receiving energy from a respective one of said first inductive devices when said one of said first inductive device and said second inductive device are in proximity;
  a second control unit comprising one or more opto-communicating circuits, wherein said second control unit communicates with a respective one of said first control circuits;
  a second switching circuit coupled to said batteries and to said second inductive device;

a battery management system coupled to said batteries, to said plurality of second control circuits and to said plurality of second switching circuits;

wherein said battery management system controls said plurality of second switching circuits to transfer energy from said plurality of second inductive devices to said batteries, and wherein said battery management system controls each of said second control circuits to communicate with a respective one of said first control circuits to control the transfer of energy between a respective first inductive unit and a respective second inductive unit, and wherein said battery management system causes one of said first switching circuits to be activated and a respective one of said second switching circuits to be deactivated during a first time period, and causes said one of said first switching circuits to be deactivated and said respective one of said second switching circuits to be activated during a second time period.

7. The system of claim 6 wherein said battery management system controls each of said plurality of first switching circuits and respective second switching circuits in a sequence that causes the transfer of energy from each of said first inductive devices to a respective one of said second inductive devices in a sequence.

8. The system of claim 6 wherein said mobile unit is part of an unmanned aerial vehicle (UAV) and each of said second inductive devices is incorporated into a leg of said UAV, and wherein said stationary unit is part of a landing platform.

9. The system of claim 1 further comprising a battery monitoring unit that monitors the state of said one or more batteries and wherein said battery management system further monitors the discharging process when said first inductive device and said second inductive device are not in proximity, wherein said battery management system comprises a microprocessor and program code that controls the operation of said battery management system, and wherein said battery management system controls the timing of said first switching circuit and said second switching circuit so that said one or more batteries are charged at a rate of approximately 1 C or greater.

10. The system of claim 6 further comprising a battery monitoring unit that monitors the state of said one or more batteries and wherein said battery management system further monitors the discharging process when said first inductive device and said second inductive device are not in proximity, wherein said battery management system comprises a microprocessor and program code that controls the operation of said battery management system, and wherein said battery management system controls the timing of said first switching circuit and said second switching circuit so that said one or more batteries are charged at a rate of approximately 1 C or greater.

\* \* \* \* \*